US008918860B1

(12) United States Patent
Enderwick

(10) Patent No.: US 8,918,860 B1
(45) Date of Patent: Dec. 23, 2014

(54) SYSTEMS AND METHODS FOR APPLICATION-POLICING A VPN

(71) Applicant: Symantec Corporation, Mountain View, CA (US)

(72) Inventor: Thomas Jeffrey Enderwick, San Francisco, CA (US)

(73) Assignee: Symantec Corporation, Mountain View, CA (US)

( * ) Notice: Subject to any disclaimer, the term of this patent is extended or adjusted under 35 U.S.C. 154(b) by 0 days.

(21) Appl. No.: 13/756,298

(22) Filed: Jan. 31, 2013

Related U.S. Application Data

(60) Provisional application No. 61/744,095, filed on Sep. 17, 2012.

(51) Int. Cl.
H04L 29/06 (2006.01)

(52) U.S. Cl.
CPC .................................. *H04L 63/0272* (2013.01)
USPC ........................................................... 726/15

(58) Field of Classification Search
USPC ........................................ 726/3, 15, 11, 23, 22
See application file for complete search history.

(56) References Cited

U.S. PATENT DOCUMENTS

| 7,822,690 | B2* | 10/2010 | Rakowicz et al. | 705/75 |
| 7,877,795 | B2* | 1/2011 | Aaron | 726/11 |
| 2010/0324981 | A1* | 12/2010 | Etchegoyen | 705/14.16 |
| 2012/0158542 | A1* | 6/2012 | Nahari | 705/26.41 |
| 2013/0054962 | A1* | 2/2013 | Chawla et al. | 713/156 |

FOREIGN PATENT DOCUMENTS

EP        1694024 A1 *   8/2006

* cited by examiner

*Primary Examiner* — Ali Abyaneh
(74) *Attorney, Agent, or Firm* — Holland & Hart LLP

(57) ABSTRACT

A computer-implemented method for establishing secure mobile communications is described. A virtual private network (VPN) between a mobile device and a server is established. A transmission of at least a portion of data between a first application and the server is blocked. It is determined whether the first application on the mobile device is a trusted application. Upon determining the first application is an untrusted application, a transmission of at least a portion of data between the untrusted application and the server continues to be blocked.

11 Claims, 8 Drawing Sheets

SYSTEMS AND METHODS FOR APPLICATION-POLICING A VPN

CROSS-REFERENCE TO RELATED APPLICATIONS

This application claims priority to U.S. Provisional Patent Application No. 61/744,095, filed on 17 Sep. 2012 entitled APP-POLICING VIRTUAL PRIVATE NETWORK, the disclosure of which is incorporated by reference herein in its entirety.

BACKGROUND

The use of computer systems and computer-related technologies continues to increase at a rapid pace. This increased use of computer systems has influenced the advances made to computer-related technologies. Indeed, computer systems have increasingly become an integral part of the business world and the activities of individual consumers. Computer systems may be used to carry out several business, industry, and academic endeavors. The wide-spread use of computers has been accelerated by the increased use of computer networks, including the Internet.

Many businesses use one or more computer networks to communicate and share data between the various computers connected to the networks. The productivity and efficiency of employees often require human and computer interaction. Users of computer technologies continue to demand an increase in the efficiency of these technologies. Improving the efficiency of computer technologies is always desirable to anyone who uses and relies on computers.

Computing systems may be mobile so that users may carry these systems as they travel, shop, work, etc. A mobile computing device may host a number of concurrently running apps, each capable of network communication. A component of the operating system of the mobile computing device, one of the apps, or a combination of the two may allow a user of the mobile computing device to connect to a server through a VPN head-end. The application may allow data to be communicated between the mobile computing device and the server. This connection may allow another application to connect to the same server and allow data to be communicated between the server and the other application. This may allow the other application to acquire data from the server that the policy of the server would not allow to be shared with the other application or to inject data the policy would not allow to be injected on the server.

SUMMARY

According to at least one embodiment, a computer-implemented method for establishing secure mobile communications is described. A virtual private network (VPN) between a mobile device and a server may be established. A transmission of at least a portion of data between a first application and the server may be blocked. It is determined whether the first application on the mobile device is a trusted application. Upon determining the first application is an untrusted application, a transmission of at least a portion of data between the untrusted application and the server may continue to be blocked.

In one embodiment, a transmission of at least a portion of data between a second application and the server may be blocked. It may be determined whether a second application on the mobile device is a trusted application. Upon determining the second application is a trusted application, at least a portion of data between the trusted application and the server may be transmitted over the VPN. Additionally, the second application may be authenticated as a trusted application. Upon determining the second application is authenticated as the trusted application, a certificate associated with the trusted application may be issued. The certificate may be associated exclusively with the trusted application. A data packet may be signed with a private key associated with the issued certificate. The signed data packet may be allowed to be transmitted over the VPN. The signed data packet may be transmitted between the trusted application and the server.

In some configurations, a network communication protocol may be established between the trusted application and the server. The network communication protocol may be established in association with the issued certificate. Data that complies with the network communication protocol may be allowed to be sent over the VPN. Data that complies with the network communication protocol may be identified as data sent between the trusted application and the server. At least a portion of data sent over the VPN between a trusted application and the server may be encrypted.

In one embodiment, a data port may be associated with the VPN. At least a portion of data may be transmitted via the associated data port. A data packet received from the associated data port may be identified as data sent between a trusted application and the server. A network policy may be enforced. The network policy may define a condition upon which a trusted application is permitted to communicate with the server over the VPN. The mobile device may be authenticated by sending a device identification associated with the mobile device via a trusted application. Additionally, a user of the mobile device may be authenticated by requiring the user to enter a user identification via a trusted application.

A computer system configured to establish secure mobile communications is also described. The system may include a processor and memory in electronic communication with the processor. The memory may store instructions that are executable by the processor to establish a VPN between a mobile device and a server. Additionally, the instructions may be executable by a processor to block a transmission of at least a portion of data between a first application and the server, determine whether a first application on the mobile device is an untrusted application, and upon determining the first application is an untrusted application, continue to block a transmission of at least a portion of data between the untrusted application and the server.

A computer-program product for establishing secure mobile communications is also described. The computer-program product may include a non-transitory computer-readable medium that stores instructions. The instructions may be executable by a processor to establish a VPN between a mobile device and a server. Additionally, the instructions may be executable by a processor to block a transmission of at least a portion of data between a first application and the VPN head-end, and block a transmission of at least a portion of data between a second application and the VPN head-end. Additionally, the instructions may be executable by a processor to determine whether a first application on the mobile device is an untrusted application, and determine whether a second application on the mobile device is a trusted application. Upon determining the first application is an untrusted application, the instructions may be executable by a processor to continue to block a transmission of at least a portion of data between the untrusted application and a server. Upon determining the second application is a trusted application, the instructions may be executable by a processor to transmit at least a portion of data between the trusted application and the server over the VPN.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
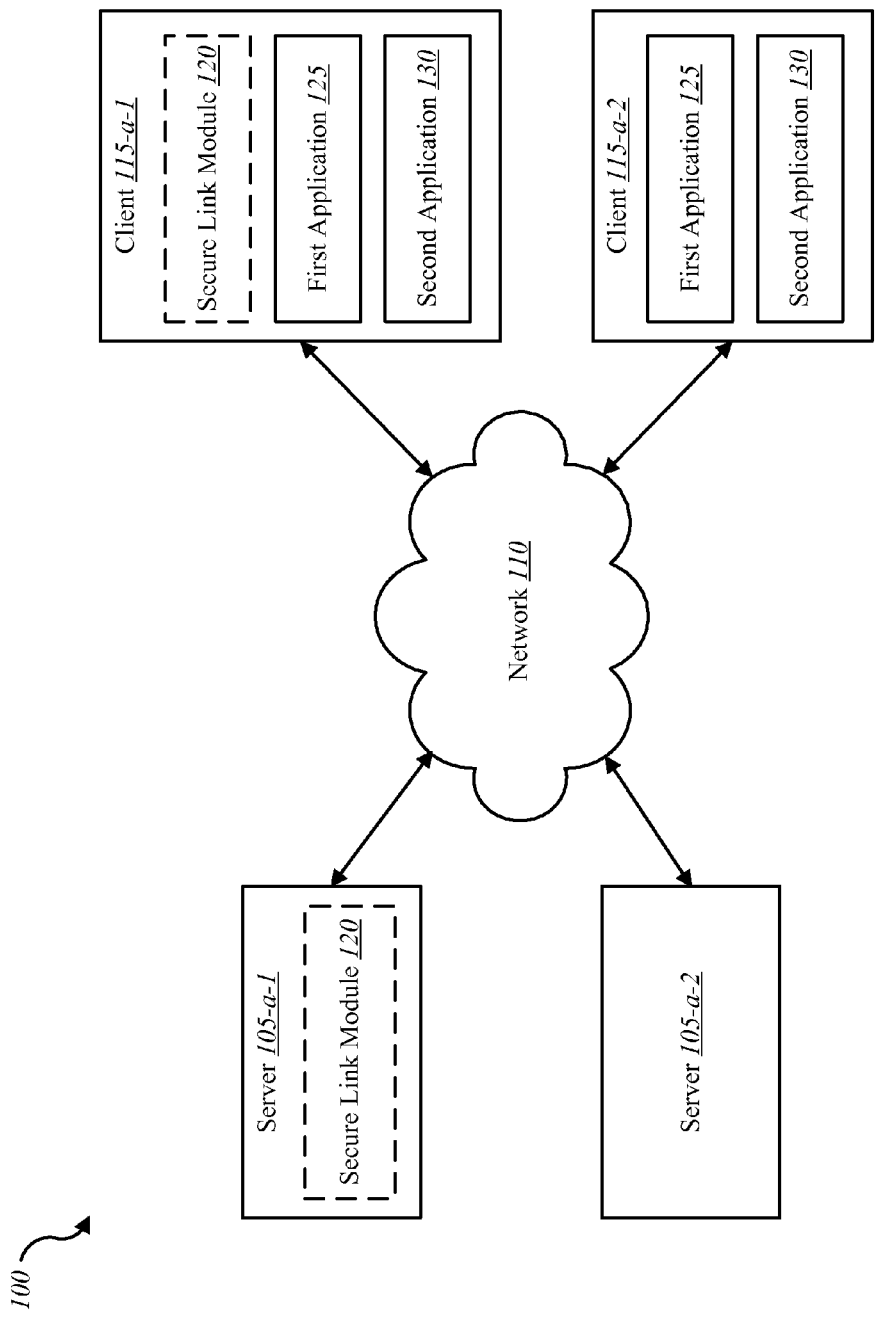
FIG. 1 is a block diagram illustrating one embodiment of an computer system in which the present systems and methods may be implemented.

While the embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

A mobile computing device may host a number of concurrently running applications (apps), each capable of network communication. A traditional virtual private network (VPN) established between a mobile device and a server may grant each of the applications on the mobile device the same authorization to network access. With the advent of mobile device "app stores" that include applications developed by relatively unknown entities across the globe, such broad authorization may present security risks to otherwise secure networks. It is desirable that privileged applications on a mobile device be granted limited network authorization, while blocking network access to non-privileged applications on the same mobile device. Such a system may discriminate between traffic from a privileged application and traffic from a non-privileged application on the same mobile device in order to permit traffic from privileged applications to transit the VPN system. Such a VPN system may enforce a policy as to what network traffic is allowed between a privileged application and a server. Restricted information may be provisioned into a privileged application via operating system (OS) sandboxing, OS key chains, in-app encryption, or other similar mechanisms such that a non-privileged application on the same mobile device is not able to access the restricted information provisioned into the privileged application.

FIG. 1 is a block diagram illustrating one embodiment of a computer system 100 in which the present systems and methods may be implemented. Although the depicted computer system 100 is shown and described herein with certain components and functionality, other embodiments of the computer system 100 may be implemented with fewer or more components or with less or more functionality. For example, some embodiments of the computer system 100 may not include a network and a server. In some embodiments, the computer system 100 may include only clients 115 and the operations of the present systems and methods occur on the clients 115. Additionally, some embodiments of the computer system 100 may include multiple servers and multiple networks. In some embodiments, the computer system 100 may include similar components arranged in another manner to provide similar functionality, in one or more aspects.

As depicted, the computer system 100 includes servers 105, a network 110, and clients 115. A first server 105-a-1 includes a secure link module 120. A first client 115-a-1 may also include the secure link module 120. Additionally, the clients 115 may include first and second applications 125, 130, respectively. Although the secure link module 120 is depicted in FIG. 1 as being located on both the first server 105-a-1 and the first client 115-a-1, other embodiments of the computer system 100 may include the secure link module 120 located solely on the first server 105-a-1 or located solely on the first client 115-a-1. Alternatively, in some embodiments, the secure link module 120 may operate concurrently on both the first server 105-a-1 and the first client 115-a-1.

One example of a client 115 includes a mobile device such as a smartphone, a tablet, a cell phone, a personal digital assistant (PDA), or other similar handheld computing device. One example of a server 105 includes a connection to a secure server such as a corporate server that is part of a secure corporate network. The network may include a VPN system. Thus, a client 115 may connect to a server 105 through a VPN head-end via a VPN system. Additionally, the network 110 may feature gateways, nodes, and other network devices. For example, the network 110 may include a VPN head-end (VPNHE), a firewall with VPN, VPN gateway, or other similar security devices to securely connect a client 115 to a server 105. In some embodiments, the network 105 may be configured to issue security policies to determine VPN parameters such as encryption and authentication algorithms.

In one embodiment, the secure link module 120 may be configured to discriminate between traffic from a non-privileged or untrusted application and traffic from a privileged or trusted application in order to permit the trusted application to communicate data over a network 110 to and from a server 105. Likewise, the secure link module 120 may be configured to block the untrusted application from communicating data over the network 110 to and from a server 105. In some configurations, the secure link module 120 may be configured to enforce a policy as to what network traffic is allowed to and from a second application 130 determined to be a trusted application.

Figure 2:
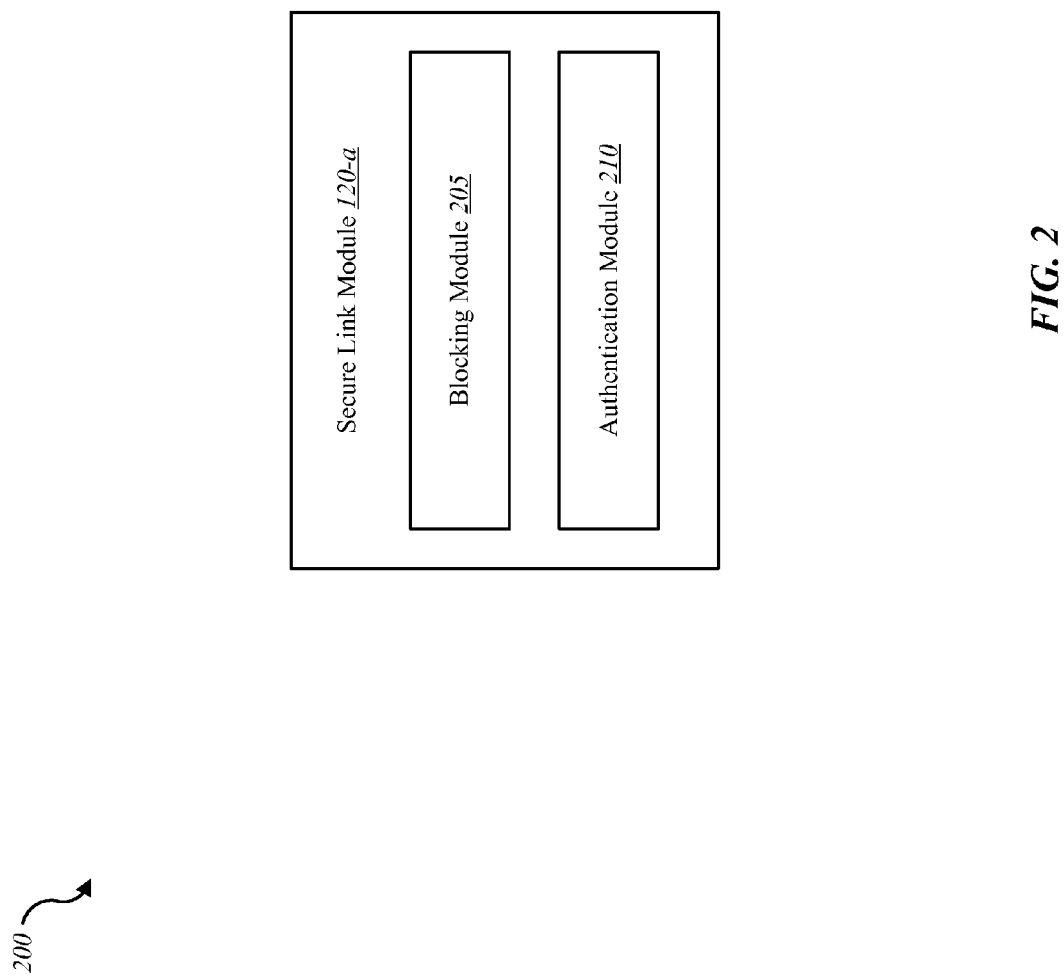
FIG. 2 is a block diagram illustrating one example of a secure link module.

FIG. 2 is a block diagram illustrating one example of a secure link module 120-a. The depicted secure link module 120-a may be one example of the secure link module 120 depicted in FIG. 1. The secure link module 120-a may include a blocking module 205 and an authentication module 210.

In one embodiment, the secure link module 120-*a* may be configured to establish secure mobile communications between a client 115 and a server 105. The secure mobile communications may be established at least in part via the secure link module 120-*a* establishing a VPN. For example, the secure link module 120-*a* may be configured to establish a VPN between a client 115 and a server 105.

In some embodiments, the secure link module 120-*a* may determine whether an application on a client 115 is a trusted application. A trusted application is an application with whom a server 105 can reliably communicate without placing the communicated data in jeopardy of an unauthorized interception or injection. Thus, the secure link module 120-*a* may be configured to establish a network communication protocol between a trusted application on a client 115 and a server 105. For example, the secure link module 120-*a* may designate the second application 130 as a privileged, or trusted application. Thus, the secure link module 120-*a* may establish a network communication protocol between the second application 130 and a server 105. For example, a VPN tunnel may be established by a component of an operating system on a client 115, one or more applications (such as the second application 130) running on the client 115, or a combination of the two. Above the VPN in the network stack, the one or more applications may establish a connection with a server (e.g., HTTP and/or secure hypertext transfer protocol (HTTPS)). The network communication protocol may be established in association with a certificate issued to the trusted application. The secure link module 120-*a* may be configured to allow data that complies with the network communication protocol to be sent over the VPN. A server 105 may interpret data that complies with the network communication protocol as data sent to or from a trusted application.

In some embodiments, the secure link module 120-*a* may be configured to associate a specific data port with the VPN. Thus, the secure link module 120-*a* may allow a transmission of data through the associated data port (e.g., a source or destination port) For example an operating system may associate the data port with an application, whereby the application may assert that it is associated with the data port. The secure link module 120-*a* may identify a data packet received from the associated data port as data sent between a trusted application, such as the second application 130, and a server 105.

In one embodiment, the secure link module 120-*a* may determine that the first application 125 is an untrusted application. Upon determining the first application 125 on a client 115 is an untrusted application, the blocking module 205 may be configured to continue to block a transmission of at least a portion of data between the untrusted application and a server 105.

In one embodiment, the authentication module 210 may be configured to authenticate a second application 130 on a client 115 as a trusted application. Upon determining the second application 130 is authenticated as a trusted application, the secure link module 120-*a* may allow at least a portion of data to be transmitted between the second application 130 and a server 105. In some configurations, the authentication module 210 may be configured to authenticate a client 115. Additionally, the authentication module 210 may be configured to authenticate a user of a client 115. For example, the authentication module 210 may utilize an authentication protocol to implement a password system, a biometric authentication system, two-factor authentication, and the like.

Figure 3:
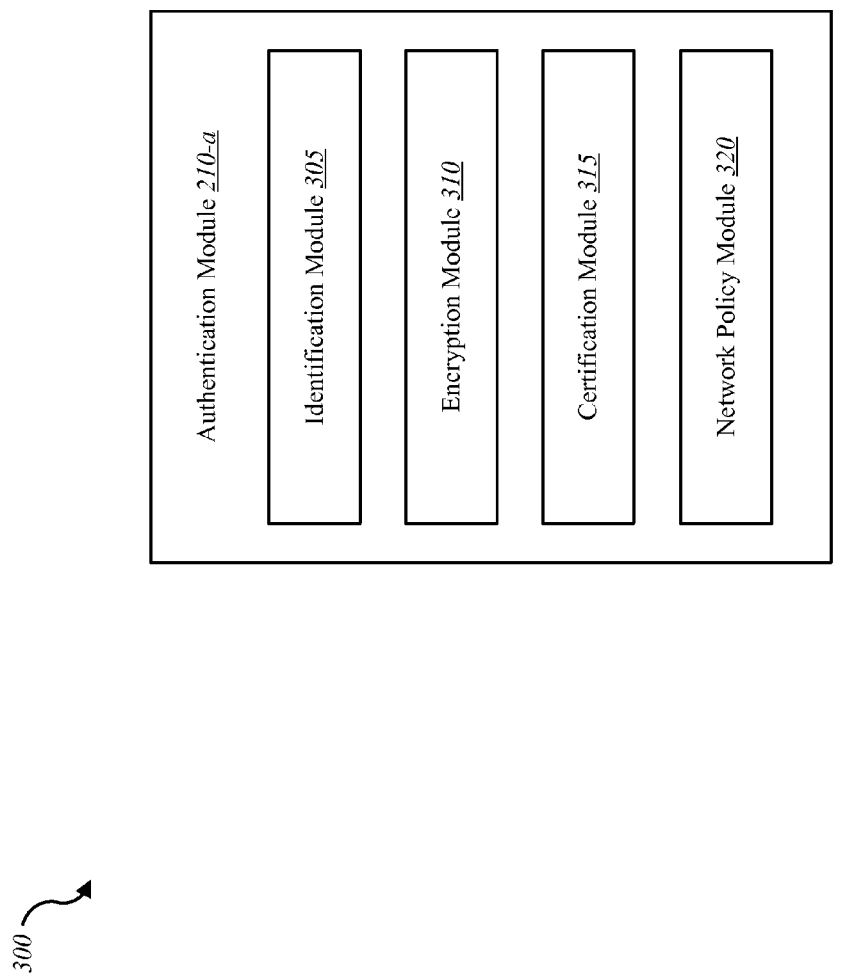
FIG. 3 is a block diagram illustrating one example of an authentication module.

FIG. 3 is a block diagram illustrating one example of an authentication module 210-*a*. The authentication module 210-*a* may be one example of the authentication module 210 depicted in FIG. 2. As depicted, the authentication module 210-*a* may include an identification module 305, an encryption module 310, a certification module 315, and a network policy module 320.

In one embodiment, the identification module 305 may be configured to determine whether a first application 125 on a client 115 is an untrusted application. Additionally, the identification module 305 may be configured to determine whether a second application 130 on a client 115 is a trusted application. For example, the secure link module 120 may be configured to establish a trust relationship with the trusted application. In some configurations, the secure link module 120 may act as a certificate authority (CA) and issue certificates that a VPN system is configured to trust. A second application 130 may communicate with the secure link module 120 to verify that the second application 130 is a trusted application. For example, the secure link module 120 may implement a password system that requires a user to enter a password to verify that the application is trusted. Additionally or alternatively, the second application 130 may require that a user navigate a biometric authentication system or a two-factor authentication such as both a password and a biometric authentication system. As described above, such a system may discriminate between traffic from a privileged application and traffic from a non-privileged application on the same mobile device in order to permit traffic from privileged applications to transit the VPN system. The secure link module 120 may enforce a policy as to what network traffic is allowed between a privileged application and a server. Restricted information may be provisioned into a privileged application such as the second application 130 via operating system (OS) sandboxing, OS key chains, in-app encryption, or other similar mechanisms. A non-privileged application on the same mobile device is not able to access the restricted information provisioned into the privileged application. In some configurations, the secure link module 120 may require that the second application 130 provide the server 105 at least a portion of this restricted information in order for the second application 130 to verify that it is a trusted application.

Upon determining the second application 130 is a trusted application, the secure link module 120-*a* may allow at least a portion of data between the trusted application and a server 105 to be transmitted over the VPN.

In one embodiment, the encryption module 310 may be configured to encrypt at least a portion of data sent over the VPN between the second application 130, determined to be a trusted application, and a server 105. For example, the encryption module 310 may encrypt data using symmetric and/or asymmetric encryption algorithms implemented in hardware and/or software. The encryption module 310 may require a public and a private key in order to grant access to the VPN system. Additionally or alternatively, the encryption module 310 may implement one or more encryption standards. For instance, the encryption module 310 may implement the data encryption standards (DES) such as 3DES, advanced encryption standards (AES) such as 256-bit AES, Rivest, Shamir, and Adleman (RSA) encryption standards such as RSA-768, secure shell (SSH), secure socket layer (SSL), transport layer security (TLS), encapsulated security payload, outer cipher block chaining, encryption tunnels, and the like.

In some configurations, the certification module 315 may be configured to issue a certificate associated with the second application 130, which is determined to be a trusted application. In some embodiments, the certificate may be associated exclusively with the second application 130. Alternatively, the certificate may be associated with a select group of applications on one or more clients 115. In one embodiment, the certification module 315 may be configured to sign a data packet with a private key associated with the issued certificate. The secure link module 120-*a* may be configured to allow the signed data packet to be transmitted over the VPN. The signed data packet may be transmitted between the second application 130, determined to be a trusted application, and a server 105.

In one embodiment, the network policy module 320 may be configured to enforce a network policy in relation to an established VPN. The network policy may define a condition upon which the second application 130, determined to be a trusted application, is permitted to communicate with a server 105 over the VPN. For example, the secure link module 120 may provide the second application 130 with a renewable certificate with a predefined expiration. The certificate may include the identity of the client 115 and the policy for the trusted application's network traffic. The policy may be explicitly stated in the certificate. Alternatively, the certificate may include an index that could be used by a VPN system to locate the policy. Additionally, the certificate may include information and credentials regarding the trusted application and a user of the client 115. The secure link module 120 may use the certificate to sign messages sent over the VPN. The message may indicate to the secure link module 120 that specific traffic is from a trusted application, allowing the secure link module 120 to enforce the policy covering the network communication of the trusted application. The enforcement of the policy may occur solely on a client 115 or solely on a server 105. Alternatively, enforcement of the policy may occur on both a client 115 and a server 105. In some embodiments, signed traffic may take the form of an on-device tunnel between the trusted application on a client 115 and a server 105.

In some embodiments, the certification module 315 may provide a signed indication. A signed indication is a signal from a trusted application to the VPN system that traffic to/from a certain connection or traffic to/from a specified port is to be considered the same as signed traffic. In some configurations, a signed indication may be sent out-of-band or in-band. For example, the certification module 315 may be configured to provide a signed indication that a data packet from a specified protocol and port is to be treated as a signed data packet. In some embodiments, the secure link module 120 may be configured to listen on a pre-determined port for a data packet sent to a pre-determined destination. The address used by the secure link module 120 to receive signed indications may be determined dynamically. In some embodiments, the second application 130, determined to be a trusted application, may be configured to initiate a transfer control protocol (TCP) session in cooperation with the secure link module 120. The second application 130 may be configured to insert a signed assertion as a preamble to the TCP session, followed by the actual data of the session. The secure link module 120 may be configured to consume the preamble and classify the remainder of the session as if the traffic included signed data packets.

Figure 4:
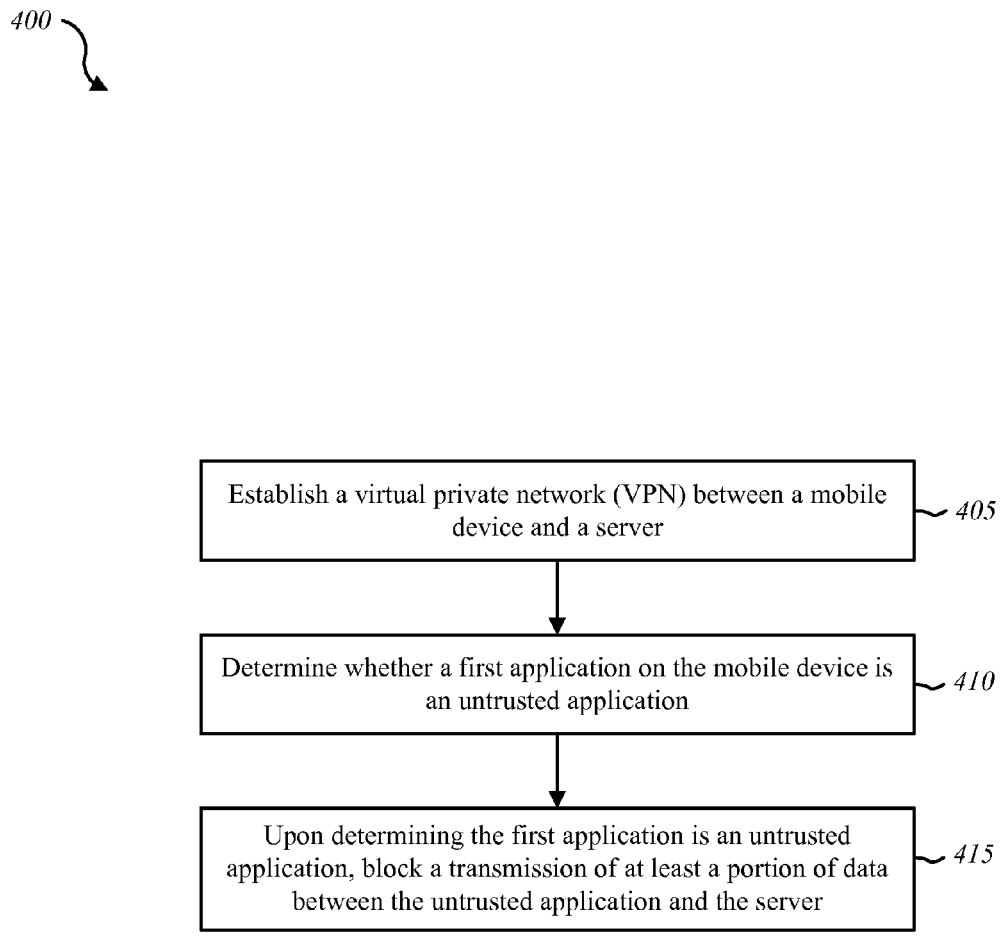
FIG. 4 is a flow diagram illustrating one embodiment of a method to establish secure mobile communications.

FIG. 4 is a flow diagram illustrating one embodiment of a method 400 to establish secure mobile communications. In some configurations, the method 400 may be implemented by the secure link module 120 depicted in FIGS. 1 and/or 2.

In one embodiment, at block 405 a VPN may be established between a client 115 and a server 105. For example, the secure link module 120 may be located on a mobile device such as an iPhone®. An application on the iPhone®, such as the second application 130, may establish a VPN with a server 105 in cooperation with the secure link module 120. Establishing the VPN may include authentication and encryption algorithms. In some configurations, the secure link module 120 located on a server 105 may establish the VPN between a client 115 and a server 105 in cooperation with the secure link module 120 located on a client 115.

In some configurations, at block 410 a first application 125 on a client 115 may be determined to be an untrusted application. Upon determining the first application 125 is an untrusted application, a transmission of at least a portion of data between the first application 125, an untrusted application, and a server 105 may be blocked at block 415.

Figure 5:
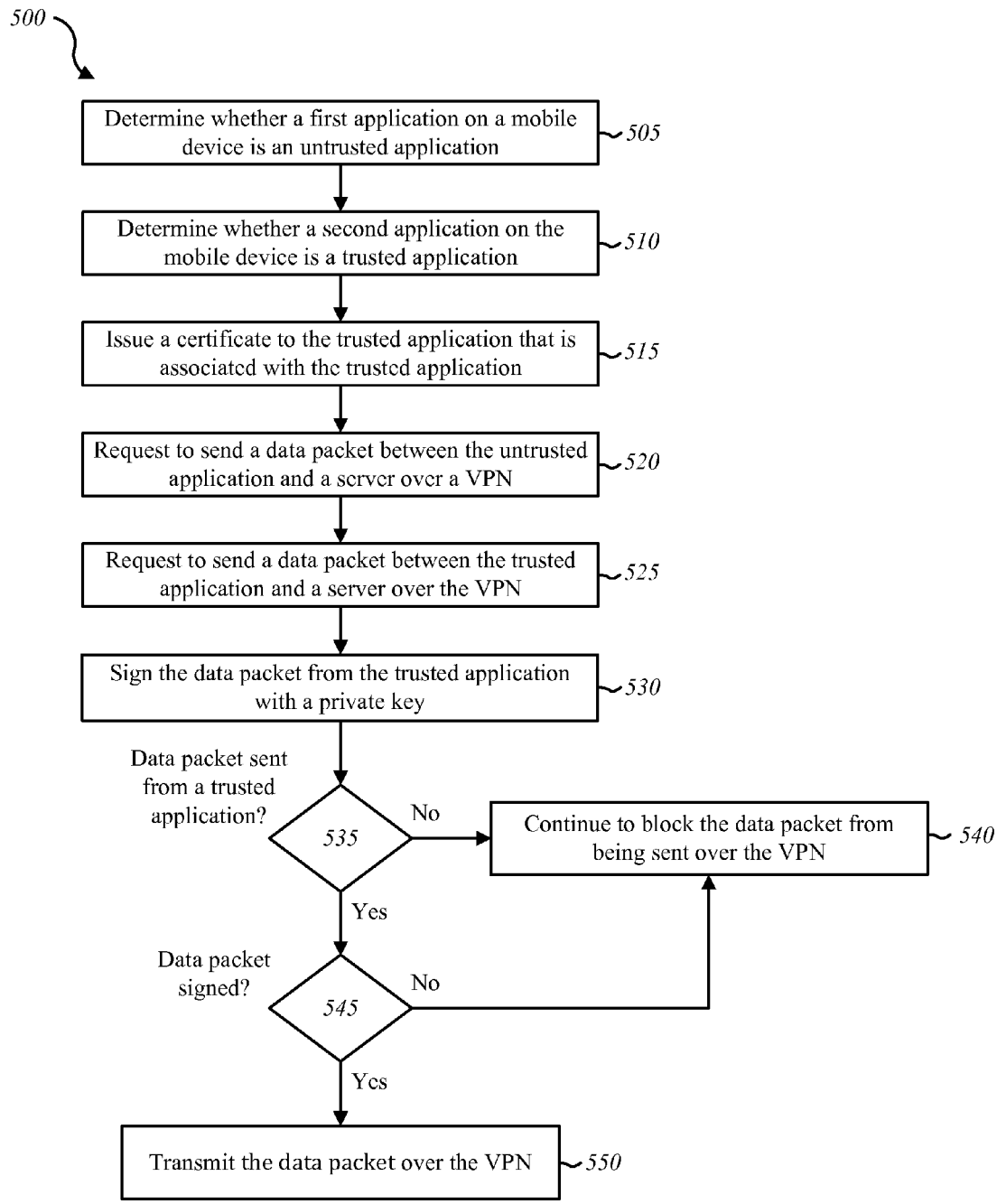
FIG. 5 is a flow diagram illustrating one embodiment of a method to block a data packet from an untrusted application.

FIG. 5 is a flow diagram illustrating one embodiment of a method 500 to block a data packet from an untrusted application. In some configurations, the method 500 may be implemented by the secure link module 120 depicted in FIGS. 1 and/or 2.

In one embodiment, at block 505 a first application 125 on a client 115 may be determined to be an untrusted application. For example, the identification module 305 may be configured to determine that a second application 130 on a client 115 is a trusted application. At block 510, upon determining the second application 130 is a trusted application, in some embodiments, the second application 130 may be authenticated as a trusted application. At block 515, a certificate may be issued to the second application 130. The certificate may be associated with the second application 130 in addition to other applications on the same client 115 on which the second application 130 is located or other clients. In some configurations, the certificate may be associated exclusively with the second application 130. In some embodiments the certificate may be associated with the client 115 on which the second application 130 is located.

At block 520, a request may be made to send a data packet between the untrusted application and a server 105 over a VPN. For example, the first application 125 may be configured to request to send a data packet between a client 115 and a server 105 over a VPN established by the secure link module 120.

At block 525, a request to send a data packet between a trusted application and a server 105 over a VPN may be made. For example, the second application 130 may be configured to request to send a data packet between a client 115 and a server 105 over the VPN.

At block 530, in some embodiments, the data packet from the trusted application may be signed with a private key. For example, the certification module 315 may be configured to sign 530 with a private key the data packet associated with the second application 130.

At block 535, it may be determined whether a data packet is sent from a trusted application. For example, the secure link module 120 may be configured to determine whether a data packet requested to be sent over the VPN is being sent between a trusted application and a server 105.

At block 540, upon determining a data packet is from an untrusted application, the data packet may be blocked from being sent over the VPN. For example, the blocking module 205 may be configured to block the data packet associated with the untrusted application from being sent over the VPN.

At block 545, upon determining a data packet is associated with a trusted application, it may be determined whether a data packet is signed. For example, the certification module 315 may be configured to determine 545 whether a data packet is signed with an issued certificate. At block 540, upon determining a data packet is not signed, the data packet may be blocked from being sent over the VPN.

At block 550, upon determining a data packet is from a trusted application and that the data packet is signed, the data packet may be transmitted over the VPN. For example, the secure link module 120 may be configured to allow the signed data packet between the trusted application and a server 105 to be transmitted over the VPN. For instance, the first application 125 and second application 130 may be located on a client 115 such as an iPhone®. The identification module 305 may determine whether the first application 125 is an untrusted application and determine whether the second application 130 is a trusted application. The certification module 315 may issue a certificate to the second application 130. Both the first and second applications 125, 130 may request to send a data packet over a VPN established by the secure link module 120. The certification module 315 may sign the data packet from the second application 130 with a private key associated with the issued certificate. The secure link module 120 may block the data packet from the first application 125 from being sent over the VPN upon determining the data packet is from an untrusted application. The secure link module 120 may allow the data packet from the second application 130 to be sent over the VPN upon determining that the second application 130 is a trusted application and that the data packet is signed.

Although the method 500 describes an operation in which a data packet may be requested to be sent from a first or second application 125, 130, respectively, in some embodiments the secure link module 120 may be configured to block a data packet from a server 105 from being sent to and received by the first application 125 identified as an untrusted application. In some embodiments, the secure link module 120 may be configured to allow a data packet from a server 105 to be sent to and received by the second application 125 identified as a trusted application.

Figure 6:
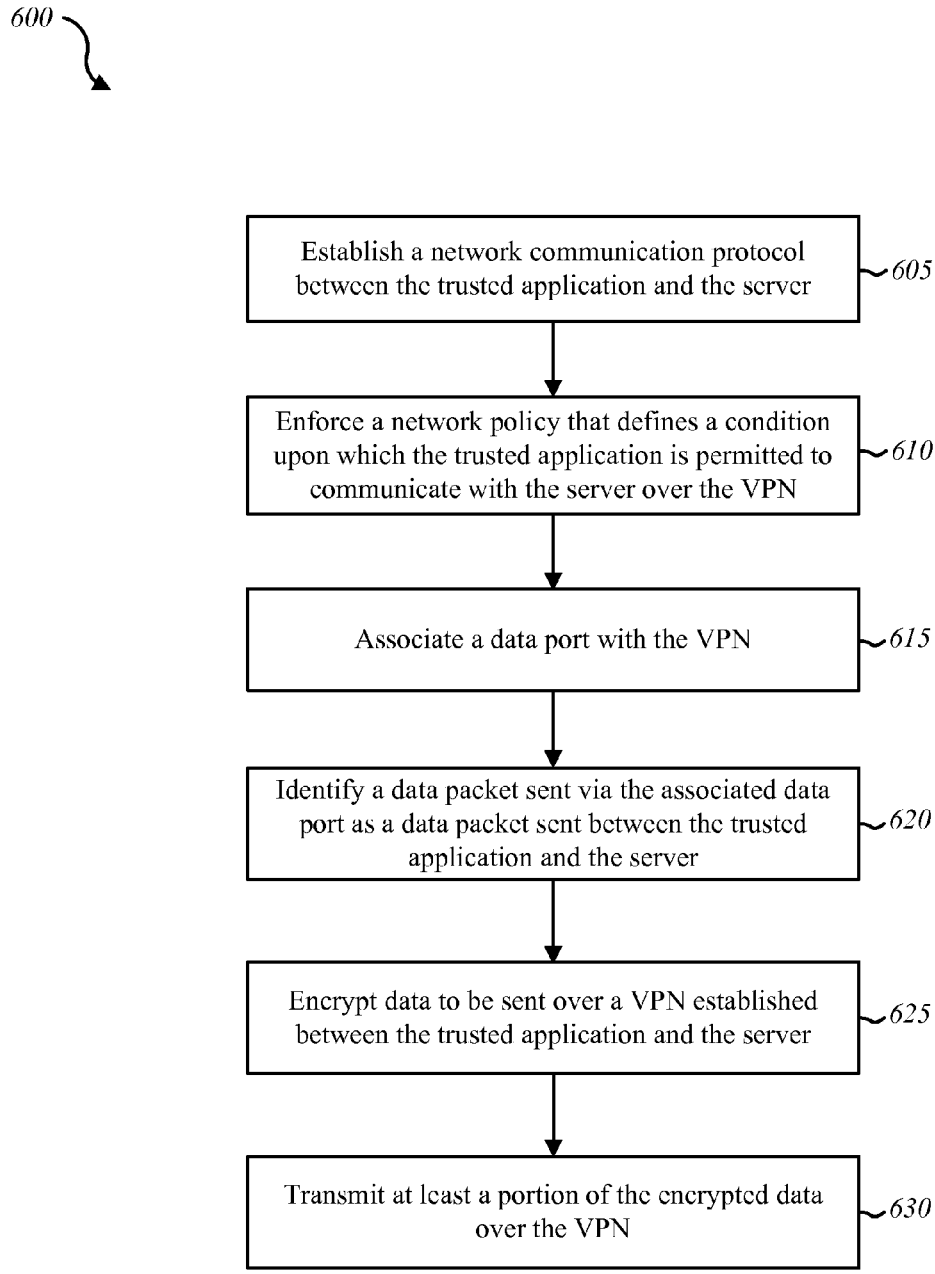
FIG. 6 is a flow diagram illustrating one embodiment of a method to send a data packet according to a network communication protocol.

FIG. 6 is a flow diagram illustrating one embodiment of a method 600 to send a data packet according to a network communication protocol. The network communication protocol may include encryption and authentication algorithms, hypertext transfer protocol (HTTP), transmission control protocol (TCP), internet protocol (IP), user datagram protocol (UDP), and other similar protocols. In some configurations, the method 600 may be implemented by the secure link module 120 depicted in FIGS. 1 and/or 2.

In one embodiment, the secure link module 120 may be configured to establish 605 a network communication protocol between a trusted application and a server 105. For example, the secure link module 120 may establish a network communication protocol between the second application 130 identified as a trusted application and a server 105. The secure link module 120 may be configured to enforce 610 a network policy that defines a condition upon which the trusted application is permitted to communicate with a server 105 over a VPN. In some configurations, the secure link module 120 may be configured to associate 615 a data port with a VPN. The secure link module 120 may identify 620 a data packet sent via the associated data port as a data packet sent between the trusted application and a server 105. In one embodiment, the encryption module 310 may be configured to encrypt 625 data to be sent over a VPN established between the trusted application and a server 105. The secure link module 120 may be configured to allow 630 at least a portion of the encrypted data to be transmitted over the VPN.

Figure 7:
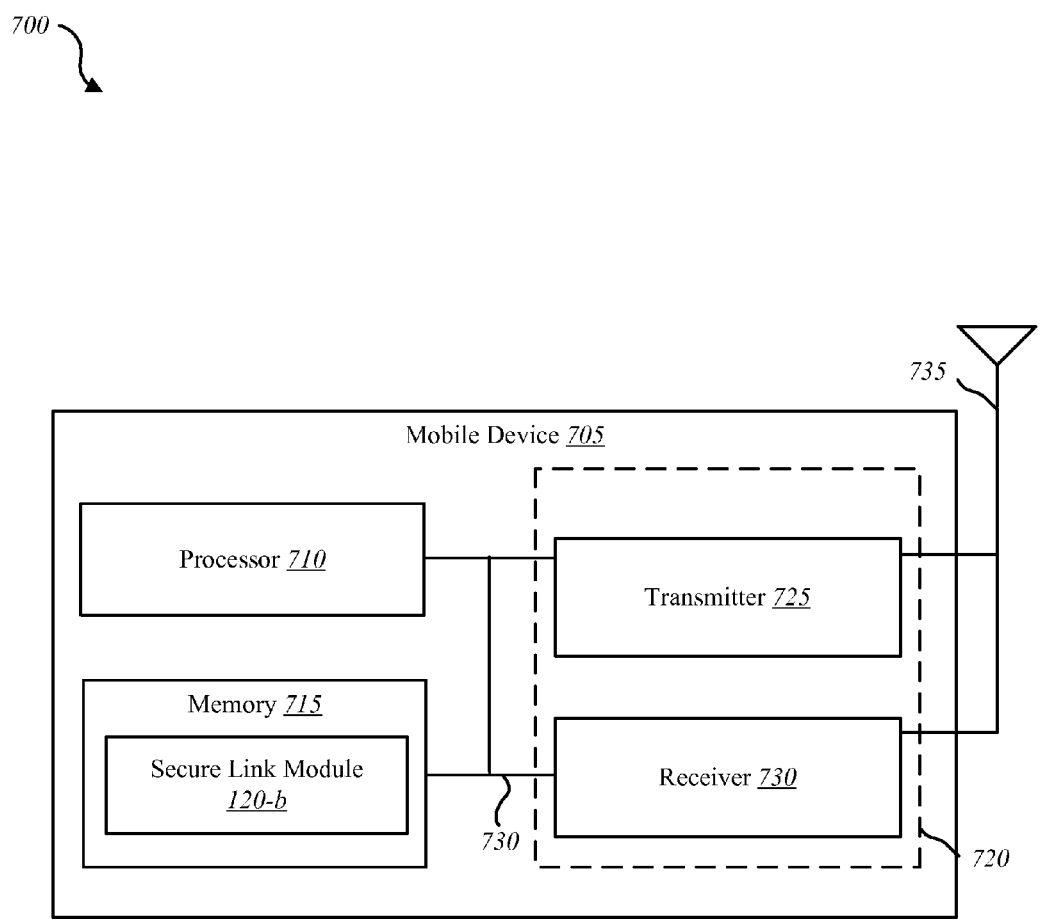
FIG. 7 depicts a block diagram of a computer system suitable for implementing the present systems and methods.

FIG. 7 depicts a block diagram of a computer system 700 suitable for implementing the present systems and methods. In one embodiment, the computer system 700 may include a mobile device 705. The mobile device 705 may be an example of a client 115 depicted in FIG. 1. As depicted, the mobile device 705 includes a bus 725 which interconnects major subsystems of mobile device 705, such as a central processor 710, a system memory 715 (typically RAM, but which may also include ROM, flash RAM, or the like), and a transceiver 720 that includes a transmitter 730, a receiver 735, and an antenna 740.

Bus 725 allows data communication between central processor 710 and system memory 715, which may include read-only memory (ROM) or flash memory (neither shown), and random access memory (RAM) (not shown), as previously noted. The RAM is generally the main memory into which the operating system and application programs are loaded. The ROM or flash memory can contain, among other code, the Basic Input-Output system (BIOS) which controls basic hardware operation such as the interaction with peripheral components or devices. For example, the secure link module 120-b to implement the present systems and methods may be stored within the system memory 715. The secure link module 120-b may be one example of the secure link module 120 depicted in FIGS. 1 and/or 2. Applications resident with mobile device 705 may be stored on and accessed via a non-transitory computer readable medium, such as a hard disk drive, an optical drive, or other storage medium. Additionally, applications can be in the form of electronic signals modulated in accordance with the application and data communication technology when accessed via a network.

Figure 8:
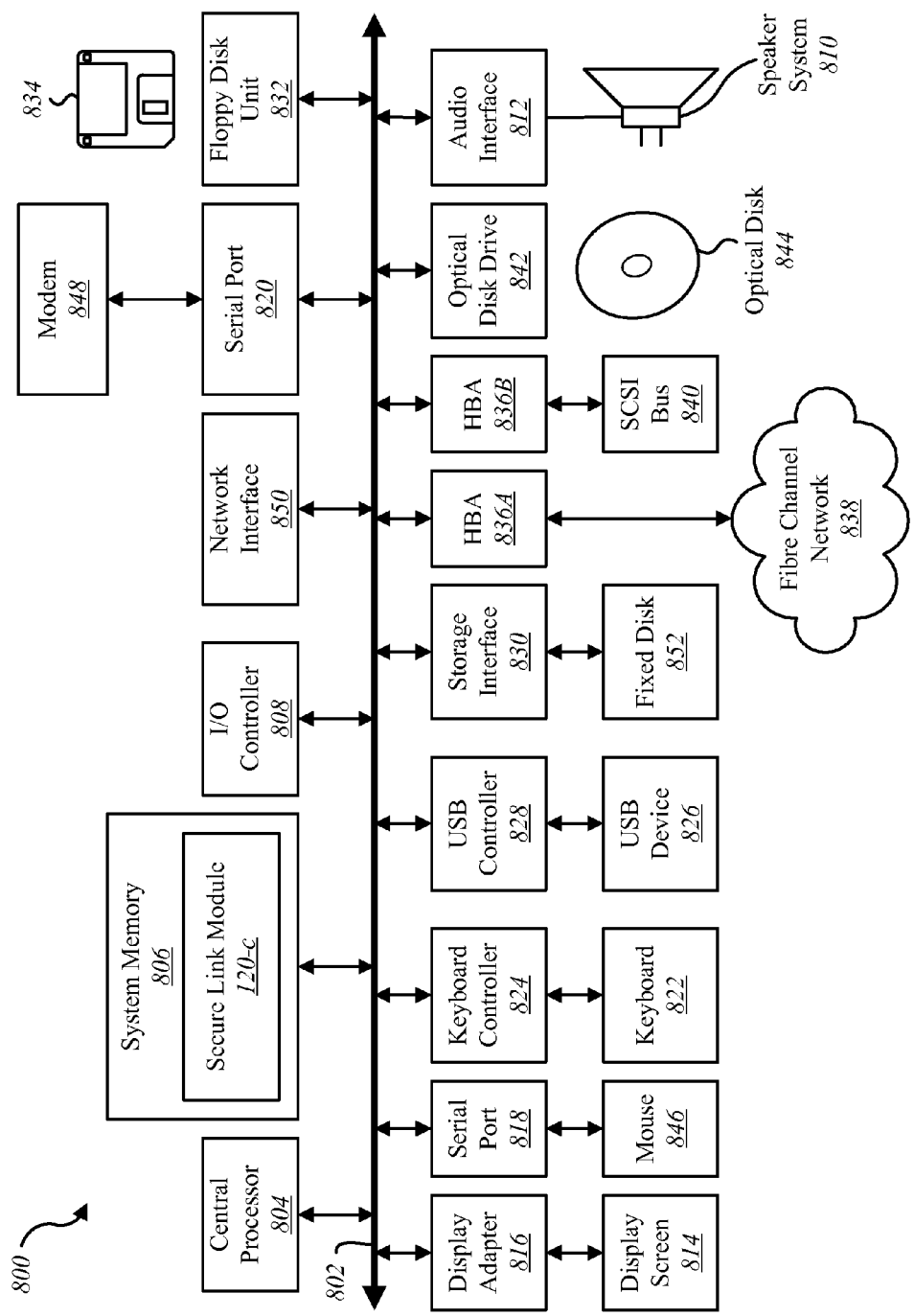
FIG. 8 depicts a block diagram of a computer system suitable for implementing the present systems and methods.

FIG. 8 depicts a block diagram of a computer system 800 suitable for implementing the present systems and methods. The depicted computer system 800 may be one example of a server 105 depicted in FIG. 1. Alternatively, the system 800 may be one example of a client 115 depicted in FIG. 1 or the mobile device 705 depicted in FIG. 7. Computer system 800 includes a bus 802 which interconnects major subsystems of computer system 800, such as a central processor 804, a system memory 806 (typically RAM, but which may also include ROM, flash RAM, or the like), an input/output controller 808, an external audio device, such as a speaker system 810 via an audio output interface 812, an external device, such as a display screen 814 via display adapter 816, serial ports 818 and mouse 820, a keyboard 822 (interfaced with a keyboard controller 824), multiple USB devices 826 (interfaced with a USB controller 828), a storage interface 830, a host bus adapter (HBA) interface card 836A operative to connect with a Fibre Channel network 838, a host bus adapter (HBA) interface card 836B operative to connect to a SCSI bus 840, and an optical disk drive 842 operative to receive an optical disk 844. Also included are a mouse 846 (or other point-and-click device, coupled to bus 802 via serial port 818), a modem 848 (coupled to bus 802 via serial port 820), and a network interface 850 (coupled directly to bus 802).

Bus 802 allows data communication between central processor 804 and system memory 806, which may include read-only memory (ROM) or flash memory (neither shown), and random access memory (RAM) (not shown), as previously noted. The RAM is generally the main memory into which the operating system and application programs are loaded. The ROM or flash memory can contain, among other code, the Basic Input-Output system (BIOS) which controls basic hardware operation such as the interaction with peripheral components or devices. For example, the secure link module 120-c to implement the present systems and methods may be stored within the system memory 806. The secure link module 120-c may be one example of the secure link module 120 depicted in FIGS. 1, 2, and/or 7. Applications resident with computer system 800 are generally stored on and accessed via a non-transitory computer readable medium, such as a hard disk drive (e.g., fixed disk 852), an optical drive (e.g., optical drive 842), or other storage medium. Additionally, applications can be in the form of electronic signals modulated in accordance with the application and data communication technology when accessed via network modem 848 or interface 850.

Storage interface 830, as with the other storage interfaces of computer system 800, can connect to a standard computer readable medium for storage and/or retrieval of information, such as a fixed disk drive 852. Fixed disk drive 852 may be a part of computer system 800 or may be separate and accessed through other interface systems. Modem 848 may provide a direct connection to a remote server via a telephone link or to the Internet via an internet service provider (ISP). Network interface 850 may provide a direct connection to a remote server via a direct network link to the Internet via a POP (point of presence). Network interface 850 may provide such connection using wireless techniques, including digital cellular telephone connection, Cellular Digital Packet Data (CDPD) connection, digital satellite data connection or the like.

Many other devices or subsystems (not shown) may be connected in a similar manner (e.g., document scanners, digital cameras and so on). Conversely, all of the devices shown in FIG. 8 need not be present to practice the present systems and methods. The devices and subsystems can be interconnected in different ways from that shown in FIG. 8. The operation of a computer system such as that shown in FIG. 8 is readily known in the art and is not discussed in detail in this application. Code to implement the present disclosure can be stored in a non-transitory computer-readable medium such as one or more of system memory 806, fixed disk 852, or optical disk 844. The operating system provided on computer system 800 may be MS-DOS®, MS-WINDOWS®, OS/2®, UNIX®, Linux®, or another known operating system.

Moreover, regarding the signals described herein, those skilled in the art will recognize that a signal can be directly transmitted from a first block to a second block, or a signal can be modified (e.g., amplified, attenuated, delayed, latched, buffered, inverted, filtered, or otherwise modified) between the blocks. Although the signals of the above described embodiment are characterized as transmitted from one block to the next, other embodiments of the present systems and methods may include modified signals in place of such directly transmitted signals as long as the informational and/or functional aspect of the signal is transmitted between blocks. To some extent, a signal input at a second block can be conceptualized as a second signal derived from a first signal output from a first block due to physical limitations of the circuitry involved (e.g., there will inevitably be some attenuation and delay). Therefore, as used herein, a second signal derived from a first signal includes the first signal or any modifications to the first signal, whether due to circuit limitations or due to passage through other circuit elements which do not change the informational and/or final functional aspect of the first signal.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

Furthermore, while various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the present systems and methods and their practical applications, to thereby enable others skilled in the art to best utilize the present systems and methods and various embodiments with various modifications as may be suited to the particular use contemplated.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising."

What is claimed is:

1. A computer-implemented method for establishing secure mobile communications, the method comprising:

establishing a virtual private network (VPN) between a mobile device and a server, wherein the mobile device includes at least a first application and a second application;

associating a data port with the second application and the VPN;

issuing a certificate to the second application;

signing a data packet from the second application with a private key, the private key being associated with the certificate issued to the second application;

blocking a transmission of at least a portion of data between the first application and the second application on the mobile device and the server;

determining whether the first application on the mobile device is a trusted application or an untrusted application, wherein an application is determined to be a trusted application if a data port is associated with the application and the VPN, and a data packet from the application is signed with a private key, the private key being associated with a certificate issued to the application;

upon determining the first application is an untrusted application, continuing to block the transmission of at least a portion of data between the untrusted application and the server;

determining whether the second application on the mobile device is a trusted application or an untrusted application; and upon determining the second application is a trusted application, transmitting, via the data port, the signed data packet over the VPN.

2. The method of claim 1, further comprising:

establishing a network communication protocol between the second application and the server, wherein the network communication protocol is established in association with the issued certificate; and allowing data that complies with the network communication protocol to be sent over the VPN, wherein data that complies with the network communication protocol is identified as data sent between the trusted application and the server.

3. The method of claim 1, further comprising:

encrypting at least a portion of data sent over the VPN between a trusted application and the server.

4. The method of claim 1, further comprising:

enforcing a network policy, wherein the network policy defines a condition upon which a trusted application is permitted to communicate with the server over the VPN.

5. The method of claim 1, further comprising:

authenticating the mobile device by sending a device identification associated with the mobile device via a trusted application.

6. The method of claim 1, further comprising:

authenticating a user of the mobile device by requiring the user to enter a user identification via a trusted application.

7. A computing device configured to establish secure mobile communications between a mobile device and a server, comprising:

a processor;

memory in electronic communication with the processor;

instructions stored in the memory, the instructions being executable by the processor to:

establish a virtual private network (VPN) between a mobile device and a server, wherein the mobile device includes at least a first application and a second application;

associate a data port with the second application and the VPN;

issue a certificate to the second application;

sign a data packet from the second application with a private key, the private key being associated with the certificate issued to the second application;

block a transmission of at least a portion of data between the first application and the second application on the mobile device and the server;

determine whether the first application on the mobile device is a trusted application or an untrusted application, wherein an application is determined to be a trusted application if a data port is associated with the application and the VPN, and a data packet from the application is signed with a private key, the private key being associated with a certificate issued to the application;

upon determining the first application is an untrusted application, continue to block the transmission of at least a portion of data between the untrusted application and the server;

determine whether the second application on the mobile device is a trusted application or an untrusted application; and upon determining the second application is a trusted application, transmit, via the data port, the signed data packet over the VPN.

8. The computing device of claim 7, wherein, upon determining the second application is a trusted application, the instructions are executable by the processor to:

establish a network communication protocol between the second application and the server, wherein the network communication protocol is established in association with the issued certificate; and allow data that complies with the network communication protocol to be sent over the VPN, wherein data that complies with the network communication protocol is identified as data sent between the trusted application and the server.

9. The computing device of claim 7, wherein the instructions are executable by the processor to:

encrypt at least a portion of data sent over the VPN between a trusted application and the server.

10. The computing device of claim 7, wherein the instructions are executable by the processor to:

enforce a network policy, wherein the network policy defines a condition upon which a trusted application is permitted to communicate with the server over the VPN.

11. A computer-program product for establishing secure mobile communications between a mobile device and a server, the computer-program product comprising a non-transitory computer-readable medium storing instructions thereon, the instructions being executable by a processor to:

establish a virtual private network (VPN) between a mobile device and a server, wherein the mobile device includes at least a first application and a second application;

associate a data port with the second application and the VPN;

issue a certificate to the second application;

sign a data packet from the second application with a private key, the private key being associated with the certificate issued to the second application;

block a transmission of at least a portion of data between the first application on the mobile device and the server;

block a transmission of at least a portion of data between the second application on the mobile device and the server;

determine whether the first application on the mobile device is a trusted application or an untrusted application, wherein an application is determined to be a trusted application if a data port is associated with the application and the VPN, and a data packet from the application is signed with a private key, the private key being associated with a certificate issued to the application;

upon determining the first application is an untrusted application, continue to block a transmission of at least a portion of data between the untrusted application and the server; and determine whether the second application on the mobile device is a trusted application or an untrusted application; and upon determining the second application is a trusted application, transmit, via the data port, the signed data packet over the VPN.

* * * * *